US008032861B2

(12) United States Patent
Fernando et al.

(10) Patent No.: US 8,032,861 B2
(45) Date of Patent: Oct. 4, 2011

(54) EXTENSIBLE OBJECT MODEL

(75) Inventors: Joseph P. Fernando, Woodinville, WA (US); Christopher L. Fraley, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 11/451,737

(22) Filed: Jun. 12, 2006

(65) Prior Publication Data

US 2006/0242655 A1     Oct. 26, 2006

Related U.S. Application Data

(63) Continuation of application No. 09/240,406, filed on Jan. 29, 1999, now Pat. No. 7,080,383.

(51) Int. Cl.
*G06F 9/44* (2006.01)
*G06F 9/445* (2006.01)
*G06F 3/00* (2006.01)
*G06F 9/46* (2006.01)
*G06F 13/00* (2006.01)

(52) U.S. Cl. ........ 717/120; 717/121; 717/174; 717/175; 719/316; 719/318

(58) Field of Classification Search ................... 707/100, 707/103 R; 711/171, 212; 717/100, 104, 717/166, 120, 121, 174, 175; 719/316, 318
See application file for complete search history.

(56) References Cited

U.S. PATENT DOCUMENTS

| 5,581,761 A | 12/1996 | Radia et al. ............... 395/702 |
| 5,608,898 A * | 3/1997 | Turpin et al. ................... 1/1 |
| 5,761,499 A | 6/1998 | Sonderegger ................ 395/610 |
| 5,778,227 A * | 7/1998 | Jordan ................................ 1/1 |
| 5,819,283 A * | 10/1998 | Turkowski ......................... 1/1 |
| 5,822,580 A * | 10/1998 | Leung ........................... 717/164 |
| 5,831,606 A | 11/1998 | Nakajima et al. ............ 345/326 |
| 5,890,167 A * | 3/1999 | Bridge et al. ..................... 1/1 |
| 5,970,252 A * | 10/1999 | Buxton et al. ................ 717/166 |
| 6,106,569 A * | 8/2000 | Bohrer et al. ................ 717/100 |
| 6,108,661 A * | 8/2000 | Caron et al. ....................... 1/1 |
| 6,163,880 A * | 12/2000 | Ramalingam et al. ........ 717/104 |
| 6,275,979 B1 * | 8/2001 | Graser et al. ................. 717/100 |
| 6,289,500 B1 * | 9/2001 | Baxter et al. ................. 717/108 |

(Continued)

FOREIGN PATENT DOCUMENTS

EP      0 757 313 A1    2/1997

OTHER PUBLICATIONS

Mass Storage, http://en.wikipedia.org/wiki/Mass_storage, pp. 1-2.*

(Continued)

*Primary Examiner* — Emerson Puente
*Assistant Examiner* — Charles Swift
(74) *Attorney, Agent, or Firm* — Woodcock Washburn LLP

(57) ABSTRACT

An extensible object model enables extending the standard methods and/or properties of an extensible object for an application through an extension object proffered at run time by an extension package Information about the extension package is registered in a database when the package is installed, and the database is used to resolve references to the extended methods and/or properties upon execution of the application. In one aspect of the invention, the extension object is cached when first referenced and subsequent references to the extension while the application is executing are resolved to the cache.

7 Claims, 6 Drawing Sheets

U.S. PATENT DOCUMENTS

| | | | | |
|---|---|---|---|---|
| 6,385,650 | B1 * | 5/2002 | Skog et al. | 709/226 |
| 6,549,901 | B1 * | 4/2003 | Loaiza et al. | 707/7 |
| 7,568,195 | B2 * | 7/2009 | Markley et al. | 717/175 |
| 2005/0256902 | A1 * | 11/2005 | Jensen et al. | 707/103 R |

OTHER PUBLICATIONS

Microsoft Press—Computer Dictionary, 1997, 348.

Microsoft Press—Computer Dictionary, 1994, $2^{nd}$ Edition, 215.

SOMobjects Developer Toolkit User Guide (An Introductory Guide to the System Object Model and its Accompanying Frameworks, IBM), Jun. 1993, 2-1-2-5.

Schmidt, R., "Dynamically Extensible Objects in a Class-Based Language", *IEEE Proceedings*, Jul. 28, 1997, 295-305.

Schmidt, D. et al., "An Object Oriented Framework for Developing Network Server Daemons", *C++ World Conference*, Oct. 1993, 1-15.

* cited by examiner

EXTENSIBLE OBJECT MODEL

CROSS-REFERENCE TO RELATED APPLICATION

This application is a continuation of U.S. patent application Ser. No. 09/240,406 (MFT-0510/35349.01) filed Jan. 29, 1999 entitled "Extensible Object Model," which is herein incorporated by reference in its entirety.

FIELD OF THE INVENTION

This invention relates generally to object-oriented run-time environments, and more particularly to providing extension to methods inherent in such environments.

COPYRIGHT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1997, Microsoft Corporation, All Rights Reserved.

BACKGROUND OF THE INVENTION

Object-oriented programming (OOP) languages are rapidly replacing the procedure-oriented programming languages that were prevalent in the early 1970's. An object is an encapsulated module of code and related data that is externally accessible only through well-defined and controlled connection points, known as the object's methods and properties. The values of an object's data defines the object's "state." Another object can determine the first object's state and optionally modify that state by specifying the first object's methods and properties in a message directed to the first object. A collection of objects is created to perform the functions a programmer wants to include in a computer application. The OOP paradigm commonly supports the collection as a hierarchy of interconnected objects in a parent-child tree model.

Various application development environments expose object models whose objects are static in nature. Such objects support a fixed ("inherent") set of properties/methods and are not extensible by external packages. Existing extension mechanisms require that extensions be provided via fixed property/methods or through collection objects. A logical and a hierarchical extension of the object model requires code, interfaces, typelibaries and computer executables to be changed.

Therefore, there is a need in the art for an extension mechanism that can be bound to a particular object in an application object model to provide functions beyond those that are standard in an application development environment, such as additional methods and/or properties for the objects that form the application. Furthermore, there is a need for an extension mechanism that allows the code for the extension to be dynamically added when the extended function is referenced.

SUMMARY OF THE INVENTION

The above-mentioned shortcomings, disadvantages and problems are addressed by the present invention, which will be understood by reading and studying the following specification.

An extensible object model enables extending the inherent methods and/or properties of an object residing at any level in an application object model hierarchy through an extension object. An extension provider object is proffered by an extension package when the extension is first referenced. The extension provider object creates an appropriate extension object that implements the computer-readable instructions and data necessary for the extension. All references to the extension are serviced by the extension object. Information about the extension package is registered in an extension database when the package is installed, and the database is used to resolve references to the extended methods and/or properties upon execution of the application. A hierarchical parent-child relationship is maintained between the object extended and the extension object that provides the extension.

In one aspect of the extensible object model, the extension provider object and the extension object are cached when first referenced and subsequent references to the extension are resolved to the cache. In addition, particular interfaces that enable the extensibility of objects in various object-oriented application development environments are described.

Because the extension object is not limited to being bound to the root object of the hierarchy, the extensible object model permits an extension to be provided to a single, particular object in the model at any level. Furthermore, because the run-time environment resolves the first reference to an extension to the appropriate extension package, extensions can be activated at application run time rather than at application compile time.

The present invention describes computerized systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF ILLUSTRATIVE EMBODIMENTS

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, particular implementations of the invention for object-oriented application development environments are described, including a Visual Studio development environment from Microsoft Corporation. Finally, in the fifth section, a conclusion of the detailed description is provided.

Hardware and Operating Environment

Figure 1:
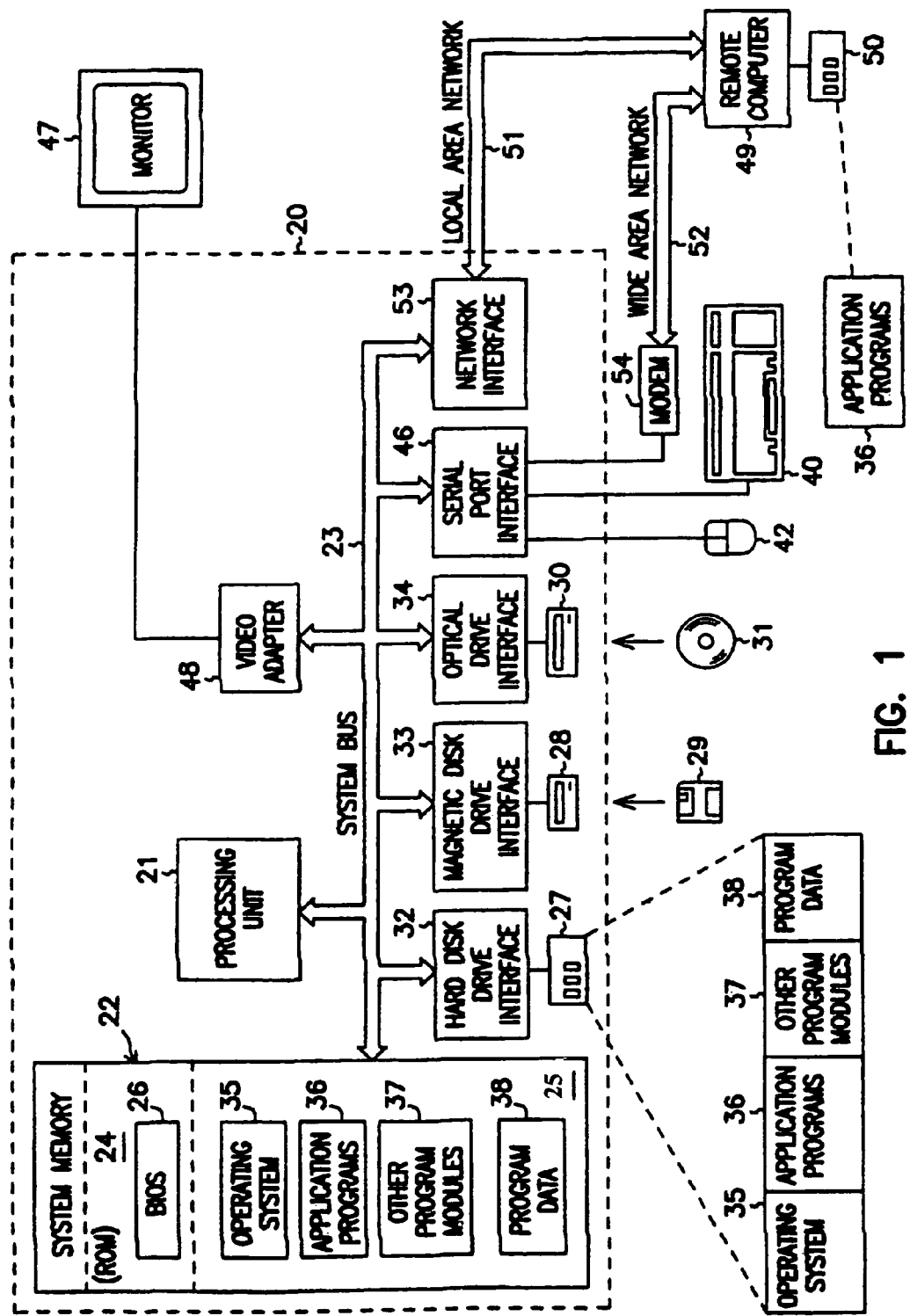
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2:
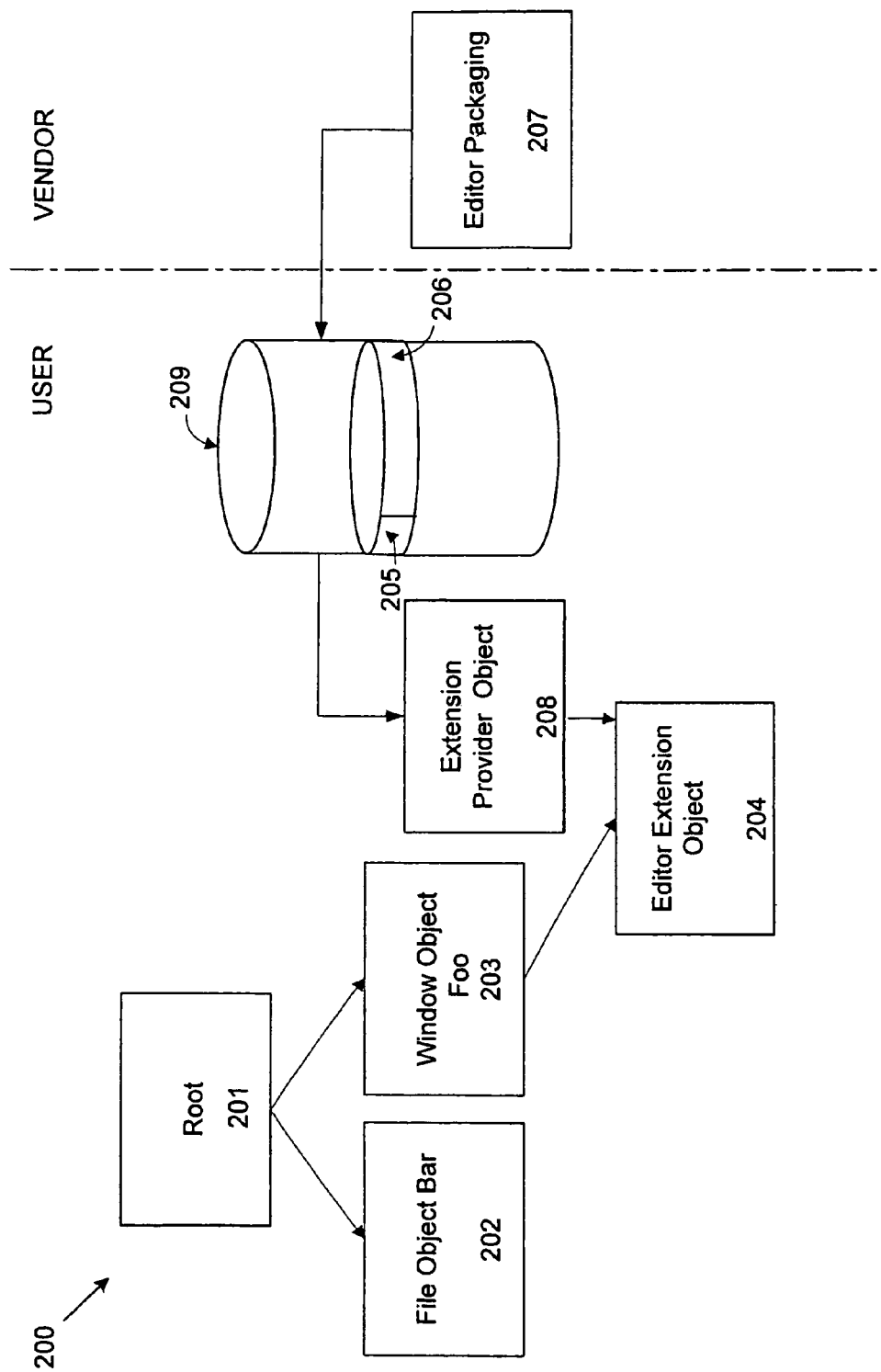
FIG. 2 is a diagram illustrating a system-level overview of an exemplary embodiment of an extensible object model of the invention.

A system level overview of the operation of an exemplary embodiment of an extensible object model is described by reference to FIG. 2. The extensible object model 200 in FIG. 2 represents an application that is executed on a standard computer, such as local computer 20 or remote computer 49 in FIG. 1. The extensible object model 200 is illustrated as a hierarchy with a root object 201 at the top of the hierarchy and two second level hierarchical objects, a "bar" file object 202 and a "foo" window object 203. Particular methods are inherent in each object in the model. For example, the foo window object 203 has inherent methods such as "close," "move," and "resize."

The inherent methods of window object 203 are extended by an "editor" method through an "editor" extension object 204 obtained via an extension provider object 208. The name "editor" for the method is not resolved, nor are the extension provider object 208 or the editor extension object 204 bound into the object model, when the application is complied or loaded. Instead the name "editor" is resolved to the extension object 204 when an application first invokes "foo.editor," known in the art as "late binding." Before the application is executed, an editor package 207 that proffers the editor extension object 204 is obtained from its vendor, registered in an extension database 205, and stored on persistent storage 209 as editor package 206.

When "foo.editor" is first invoked by the application, the run-time environment executing the application determines that the editor method is not inherent to the foo window object 203 and searches the extension database 205 to locate the editor package 206. The package 206 proffers the extension provider object 208, which is responsible for creating the editor extension object 204 to service all calls to the editor method. A locator value for the editor method is cached to bind the method name "editor" to the editor extension object 204 when the first invocation of foo.editor is made. Binding through a locator value is referred to in the art as "ID binding." Subsequent references to foo.editor are directed to the editor extension object 204 by the run-time environment.

As will be immediately perceived by one skilled in the art, the extensible object model is not limited to extending an object with only additional methods but is equally capable of extending an object's properties. Furthermore, both late and ID binding of the extension and extension provider objects into the object model has readily apparent benefits, including the ability to ship an object-based application without providing all extended capabilities in the same package.

While the object model illustrated in FIG. 2 shows the extension object being bound to a single window object 203, the extension object is equally capable of being bound to a collection of window objects to extend each object in the collection. Moreover, a single extension package can proffer more than one type of extension object by parameterizing the extension provider object so that parameters input into the extension provider object determine the type of extension object created.

The system level overview of the operation of an exemplary embodiment of the invention has been described in this section of the detailed description. An extensible object model enables an object at any level in the model hierarchy to be extended by binding an extension object with additional functionality into the model. The binding is at invocation time of the extension through either ID or late binding. While the invention is not limited to any particular object model hierarchy, for sake of clarity a simplified, extended two-level hierarchical object model has been described.

Methods of an Exemplary Embodiment of the Invention

In the previous section, a system level overview of the operation of exemplary embodiments of the extensible object model were described. In this section, the particular methods performed by a computer implementing such exemplary embodiments are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable computers (the processor of the clients executing the instructions from computer-readable media). The methods described in this section can be equated directly to methods of the extensible objects themselves or can be computer-executable instructions performed by other objects in the run-time environment.

Figure 3A:
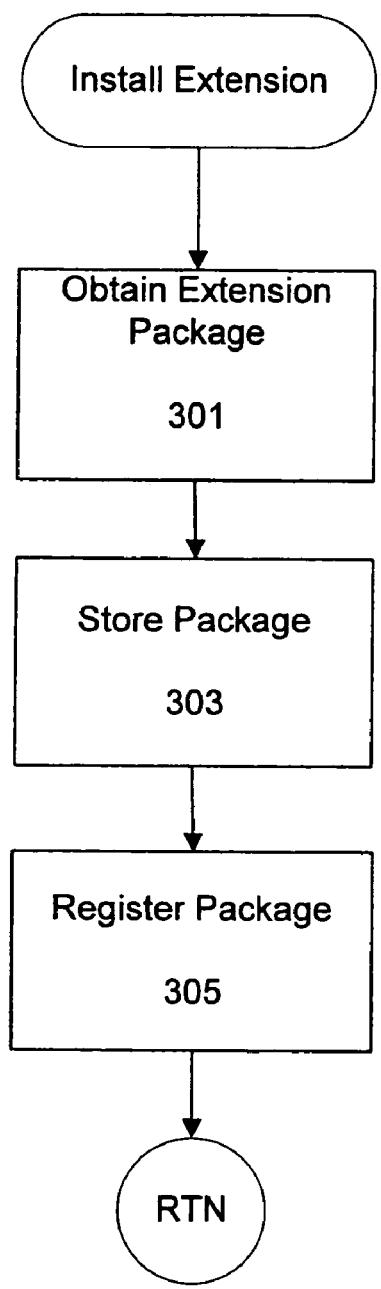
FIG. 3A is a flowchart of a method to be performed by a computer to install an extension package according to an exemplary embodiment of the invention.

Referring first to FIG. 3A, a flowchart of a method to be performed by a computer according to an exemplary embodiment of the extensible object model is shown. The extensible object model contains at least one extension provider object capable of proffering at least one extension object to service a method or property that extends a standard object in the model as described in the previous section. Before the application employing the extensible object model is executed, an extension package containing computer-executable instructions for the extension provided through the extension object is obtained (block 301). When the package is installed on the computer, the installation process stores the package (block 303) on persistent storage and registers the package by creating a corresponding entry in an extension database (block 305) under the extension name. The package also contains computer-executable instructions to proffer the extension provider object and the appropriate extension object when the extension(s) is invoked. In one embodiment, the user of the computer obtains and installs the package directly. In an alternate embodiment, the installation process for the application causes the package to be obtained and installed.

Figure 3B:
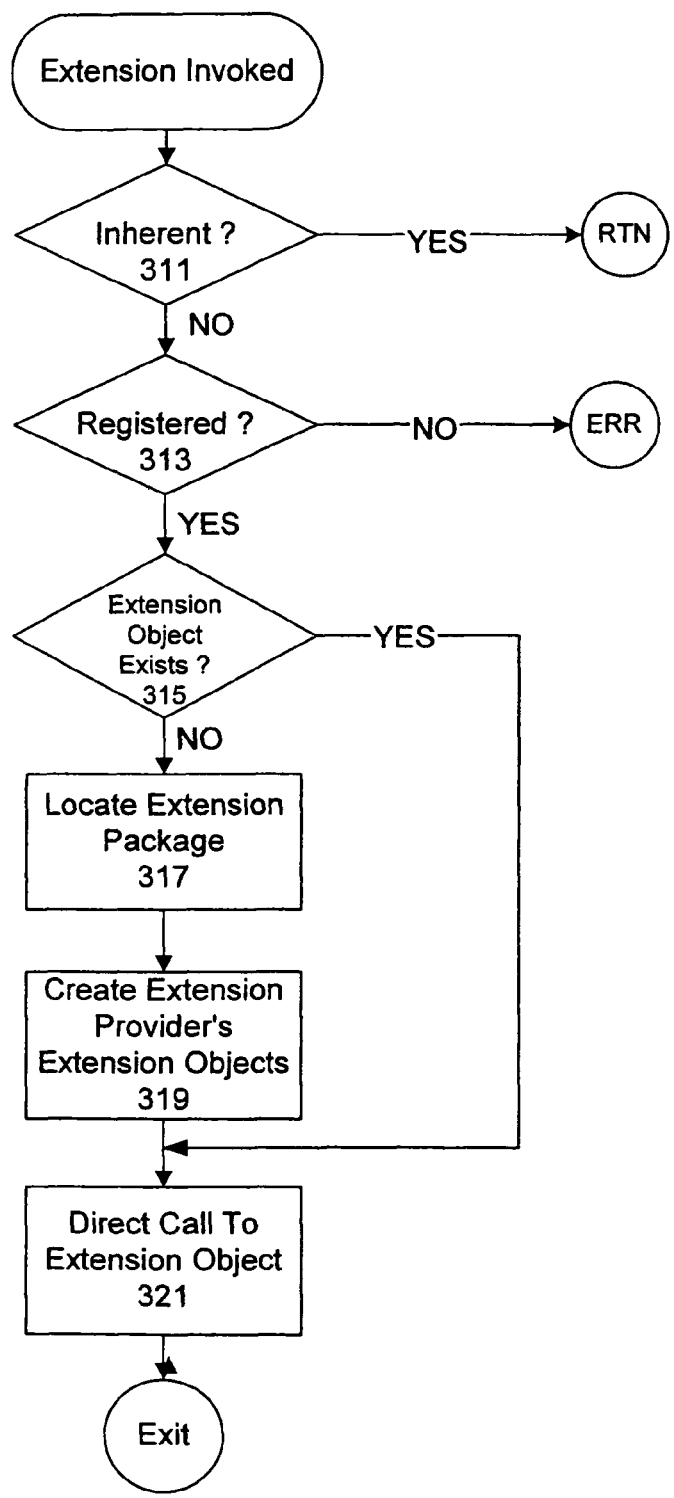
FIG. 3B is a flowchart of a method to be performed by a computer to resolve a reference to an extension at run-time.

FIG. 3B illustrates the actions taken by the run-time environment of the extensible object model when an application invokes a method or property for an extensible object. The run-time environment determines if the method or property is inherent to the object being referenced (block 311), If it is, the run-time environment continues its normal processing. If the method or property is not inherent to the object being referenced, the runtime environment determines if the extension is registered in the extension database (block 313). If the extension is not registered, the run-time environment returns an error.

If the extension is registered, the run-time environment uses the corresponding entry in the extension database to determine if the extension object for the extension exists (block 315). If so, the run-time environment processes the invocation of the extension method or property by directing the call to the associated function provided by the extension object (block 321).

If no extension object exists, the run-time environment uses the extension's entry in the extension database to locate the package that proffers the extension provider object (block 317). The package creates the extension provider object, which then processes parameters passed in by the run-time environment to create the appropriate extension object (block 319 The run-time environment then directs the call to the extension object (block 321).

In one embodiment, the entry in the extension database contains a locator (such as a. "moniker" or "clsid") for the extension package that causes the computer-readable instructions and data for the extension provider object and the extension to be read from persistent storage at block 321. In an alternate embodiment, both the extension provider object and the extension object are cached when first invoked so the instructions and data as read from cache at block 321 on subsequent calls.

The particular methods performed by a computer for an exemplary embodiment of t extensible object model have been described. The method performed to register an extension has been shown by reference to a flowchart including all the steps from 301 until 305. The method performed to resolve an extension has been shown by reference to a flowchart including all steps from 311 until 319.

Application Development Environment Implementation

In this section of the detailed description, particular implementations of the extensible object model are described which are applicable in a general object-based application development environments such as Microsoft's Visual Studio development environment. Because the extensible object model provides extensions that are accessible through late or binding and thus the extension objects do not have to be present when an application is developed, independent software vendors (ISVs) can readily extend an application from another vendor by proffering additional methods and/or properties for the objects comprising the application.

Figure 4:
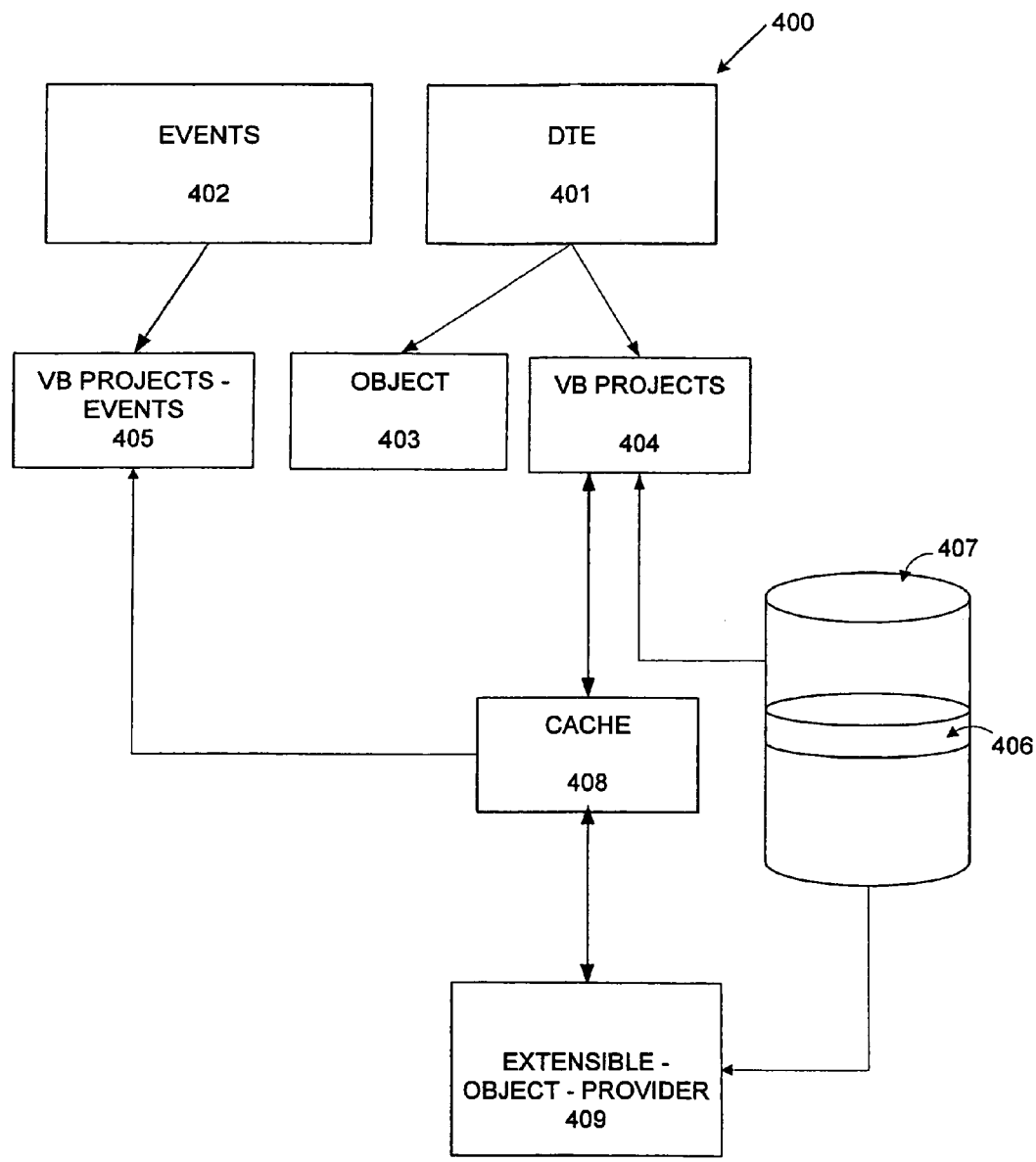
FIG. 4 is a diagram illustrating an exemplary implementation of the extensible object model.

As illustrated in FIG. 4, an exemplary embodiment for an application based on an extensible object model 400 contains a DTE (Design Time Environment) object 401 at the root level of the hierarchy. An events object 402 acts as a centralized monitoring and sourcing object for events generated by the objects in the model 400 as described in co-pending U.S. patent application Ser. No. 09/017,988, titled "EVENT SOURCING AND FILTERING FOR TRANSIENT OBJECTS IN A HIERARCHIAL OBJECT MODEL," filed on Feb. 3, 1998 and assigned to the assignee of the present application. Additional objects for the application employing the extensible object model 400 are collectively represented by object 403. It should be noted that the object model can contain object collections as well as individual objects and that extensions can be applied to both.

Two extension objects obtained through the methods described in the previous section are illustrated in FIG. 4. One is a "VBProjects" extension object 404 that adds Basic language capabilities to the development environment by extending the methods and properties of the DTE object 401. All objects, such as object 403, residing below the DTE object 401 can also be extended. The other extension object is a "VBProjectsevents" extension object 405 that extends the events object 402 to handle and re-expose events generated by the VBProjects object 404. While FIG. 4 shows the extension object 404 extending the DTE object 401, this is for the sake of simplicity in illustration and the invention is not limited to extending only root objects.

The VBProjects extension object 404 is referred to as dte.VBProjects. An application that employs the extensible object model shown in FIG. 4 can invoke methods (such as NewProject, OpenProjectFromFile) and properties (such as CountOfProjects) exposed by the VBProjects extension object 404 via late or ID binding. When such an invocation occurs, the run-time environment searches for the invocation name in the fixed (non-extensible) region of the name space that contains the inherent methods and properties for the object model. If the name cannot be resolved, then the extension database is queried to locate the extension package 406. As described above, the package 406 is loaded from persistent storage 407 and proffers an ExtensibleObjectProvider object 409 as the extension provider object. Using an identifier for the object being extended and the extension name for the method or property, the appropriate VBProjects extension object 404 is created by the ExtensibleObjectProvider object 409. If this is the first invocation of the method or property in the package, the ExtensibleObjectProvider object 409 and the VBProjects extension object 404 are cached in memory 408. Subsequent invocations to the same method or property on the same extended object with the same arguments (as appropriate) are delegated directly to the cached VBProjects extension object 404; subsequent invocations to different extended objects, or to different methods or properties provided by the extension package 406, are directed to the cached ExtensibleObjectProvider object 409.

Similarly, an application that employs the extensible object model shown in FIG. 4 can synchronize events by obtaining a specialized event filtering and sourcing object (VBProjectsevents) 405 through a centralized "events" monitoring and sourcing object 402 by providing the appropriate filtering arguments. When an application first invokes dte.events.VBProjectevents(args), the extension database is queried and the extension package 406 located and loaded. The extension package 406 proffers the ExtensibleObjectProvider object 409. The VBProjectsevents extension object 405 is obtained by passing the filtering arguments into the ExtensibleObjectProvider object 409, which then proffers the VBProjectsevents extension object 405.

Figure 5:
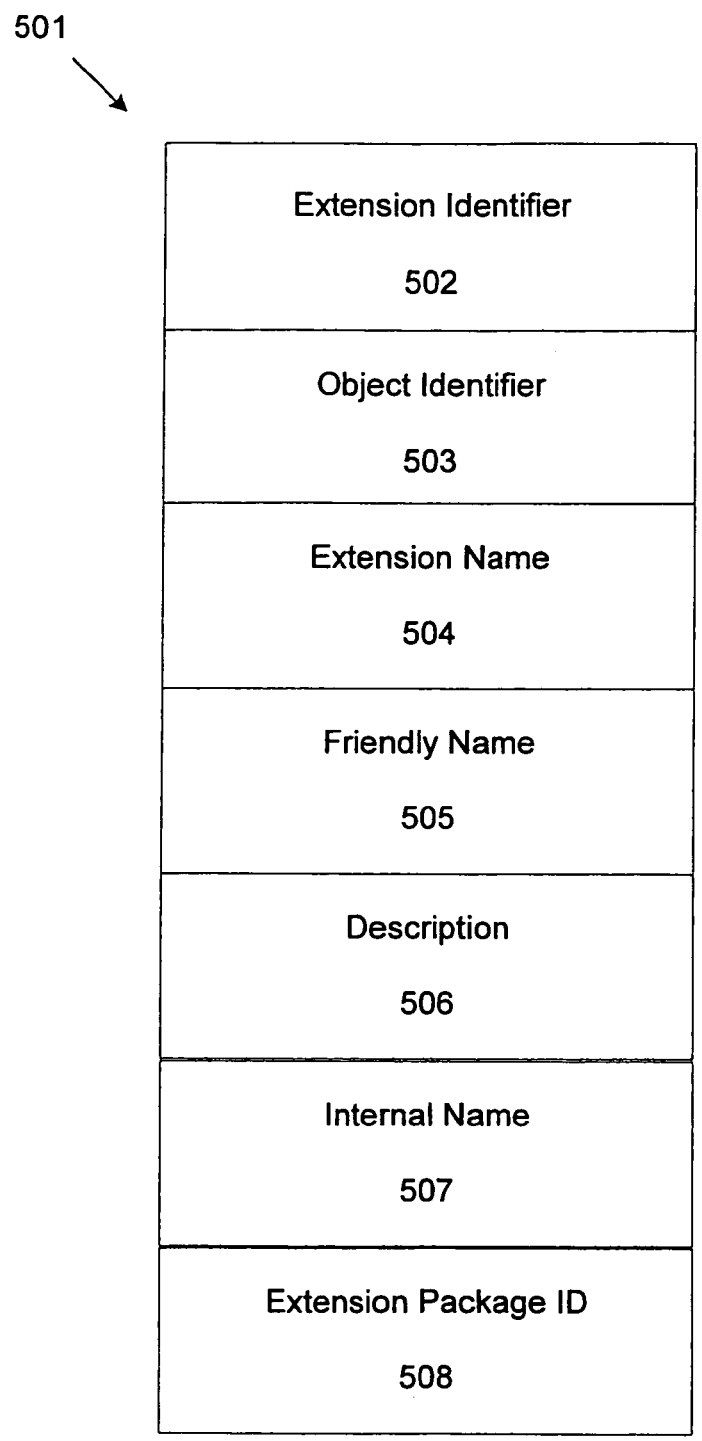
FIG. 5 is a diagram of an entry in an extensible data structure for use in an exemplary implementation of the extensible object model.

In one embodiment, an extension database is maintained for each application employing the extensible object model. Each record in the database is associated with a registered package and contains data pertaining to a particular extension. FIG. 5 illustrates an exemplary embodiment for a database record 501 comprising an extension identifier 502, an object identifier 503 for the object to be extended, an extension name 504, a friendly name 505 for the extension, a description field 506, an internal name 507, and an identifier 508 for the extension package. The friendly name 505 and the description field 506 are displayed by a development environment browser when the user browses through the components of the development object model. The package typically exposes the extension name 504 as its external property name. The extension name 504 for a particular package is mapped to the internal name 507 that is actually used when calling into the package. Because the mapping decouples the extension and internal names, there can be duplicate extension names in the object model, with the restriction that extension with identical extension names cannot be used to extend the same object. Furthermore, decoupling the extension and internal names allows a different versions of a package to proffer different versions of the same extension object without having the change the extension name that is bound into the object model.

Additional details for the fields of the database record 501 are given in Table 1.

TABLE 1

| Field | Data Type | Comments |
|---|---|---|
| ExtensionID | identity | Unique identifier for each extension |
| ObjectID | varchar(256) | Identifier for the extensible object. Typically Name of Object, i.e. 'DTE' |
| ExtensionName | ntext | Extension Name for the extension, i.e. 'VBProjects' |
| FriendlyName | ntext | Friendly Name for the extension, i.e. 'VBProject collection object[1] |
| Description | ntext | Description of the extension, i.e. 'enumerates the collection of the VBProjects in the workspace' |
| InternalName | Ntext | Name to be used when calling the package for the extension |
| ProgID | ntext | Identifier of the extension package, i.e. {pkg clsid} |

In an alternate embodiment running under one of the Microsoft Windows family of operating system, entries in the Windows registry comprise the extension database. Each package entry appears as follows:

```
/software
    /microsoft
        /visual studio
            /packages
                /{pkg clsid} = "Some extension Provider"
                    /automation
                        /ObjectID
                            /"foo" = "Description String"
                                /InternalName
                                /FriendlyName
```

In both embodiments, the run-time environment registers the relevant method and/or property information in the appropriate application database or under the appropriate registry key when the extension package is installed. Furthermore in both embodiments, a package can provide more than one extension by proffering different extension objects, with each extension having a separate entry in the appropriate database.

In the exemplary implementation, the extensible object model provides an internal extension interface so that an object derived from the interface inherits the ability to maintain parent-child relationships between itself and its extension object(s) in an extensible environment.

```
[
uuid(<<GUID>>),
version(1.0), od1, hidden, restricted
]
interface IExtensibleObjectSite : IUnknown
{
HRESULT NotifyDelete( [in] IUnknown *punkObj);
HRESULT GetSiteID ([out] Variant *varObjID);
}
```

Extension provider objects, such as ExtensibleObjectProvider object 409, implement the following interface:

```
[
uuid(<<GUID>>),
version(1.0), od1, hidden, restricted
]
interface IExtensibleObjectProvider : IUnknown
{
HRESULT GetAutomationObject([in] BSTR Name,
[in] IExtensibleObjectSite *pParent, [in] VARIANTARG_RPC_FAR
*rgvarg, [in] UINT cArgs; [out] IDispatch **ppDisp);
}
```

In order to establish the appropriate parent-child relationship between the object to be extended (the parent) and the extension object (the child) at run-time, when the extension is first invoked, the run-time environment locates the package and issues a standard QueryInterface call to obtain the IExtensibleObjectProvider interface. The parent object is queried for its IExtensibleObjectSite interface using QueryInterface. The required extension object (AutomationObject) is obtained via a call to "IExtensibleObjectProvider: :GetAutomationObject( )," passing in the corresponding extension name and the parent's IExtensibleObjectSite interface, along with additional arguments as appropriate. If the extension name does not uniquely identify the extension object to be proffered, the extension provider object calls the "IExtensibleObjectSite::GetSiteID" method to get the identity of the parent object (ObjectID). The combination of the parent identifier and the extension name uniquely identifies the corresponding extension object. Once the appropriate extension object is identified, its interface pointer (IDispatch) is returned. Because a parent object must exists as long as the extension (child) object exists, the extension object notifies parent object via "IExtensibleObjectSite: :NotifyDelete" when the extension object is to be deleted so that the parent object can perform its required clean-up duties.

In an alternate embodiment, extensible objects support a special method, "GetObject(ExtensionName, . . . )," which has its name present in the fixed name space for the object. Hence, applications can bind to this method at compile time ("early binding"). When the GetObject method is invoked, it performs all the extensible object binding mechanics, as previously described, to obtain the extension object. Therefore, the extensible object model in this embodiment can be employed by application development languages that do not readily support late binding. For example, dte.events.GetObject("VBProjectsevents") returns an object that is obtainable through dte.Events.VBProjectsevents in FIG. 4.

In the Visual Studio exemplary implementation, the extension database is stored in the Windows registry and each entry is as follows:

```
/software
    /microsoft
        /visual studio
            /packages
                /{pkg clsid} = "Some extension Provider"
                    /automation
                        /"foo" = "Description String"
                            /FriendlyName
```

Neither the ObjectID nor the InternalName are present in this implementation. Each extension package is cached after one of its extensions is first invoked.

In one embodiment of the extensible object model in Visual Studio, an extension package must support an ISvPackage interface.

```
interface uuid(<<GUID>>)
IVsPackage : public IUnknown
{
public:
...
    virtual HRESULT STDMETHODCALLTYPE GetAutomationObject(
        * [in] */ LPCOLESTR pszPropName,
        * [out] */ IDispatch___RPC__FAR *___RPC__FAR
        *ppDisp) = 0);
    ...
};
```

In a simplified manner, the "IVsPackage::GetAutomationObject" method supplies the functionality provided by the IExtensibleObjectProvider::GetAutomationObject described previously.

When an extension that does not require arguments is invoked, the run-time environment uses the IVsPackage: :GetAutomationObject method to obtain the extension object for the given name from the package. If an extension requires arguments, an intermediate automation object is obtained through the IVsPackage;:GetAutomationObject method using a pre-defined name for the intermediate automation object. Using this intermediate automation object, an identifier (DispID) is obtained for the extension object via a call to IDispatch: :GetIDsOfNames for the given extension. Then IDispatch::Invoke is called, passing in the arguments for the extension.

In this section, particular implementations of the extensible object model for object-oriented application development environments have been described, including exemplary embodiments of the extension database and interfaces created in the extensible objects to resolve the name of an extension to the corresponding extension object that implements the instructions for the extension.

CONCLUSION

An extensible object model has been described that enables the binding of extended functions to objects in the model at application run time. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the an will appreciate that although user applications have been used to illustrate the invention, the extensible object model is appropriate to other applications. Consider an operating system in which hardware components are represented as objects, so that, for example, a tape drive object can be extended with different compression objects that implement various tape compression algorithms.

Furthermore, those of ordinary skill within the art will appreciate that the terminology used in this application with respect to the Microsoft Visual Studio development and run-time environments is meant to include all object-oriented environments which incorporate an object model. Therefore, it is manifestly intended that this invention be limited only by the following claims and equivalents thereof.

What is claimed:

1. A computer-readable storage medium, the computer readable storage medium not being a transient signal, the computer-readable storage medium having stored thereon an entry for an object model extension comprising:
    an extension identifier field containing data representing an identifier for an extension for extending a method to a class object;
    an extension name field containing data representing an external name for the extension identified by the extension identifier field; and
    an extension package identifier field containing data representing an extension package for the extension identified by the extension identifier field, the extension package comprising computer-executable instructions for proffering an extension provider object upon a determination that an extension object does not exist, the extension provider object capable of receiving parameters for creating the extension object based upon one or more received parameters when the extension is invoked.

2. The computer-readable storage medium of claim 1, further comprising:
    an object identifier field containing data representing the class object having functionality extended by the extension identified by the extension identifier field.

3. The computer-readable storage medium of claim 1, further comprising an internal name field containing data representing an internal name for the extension identified by the extension identifier field, the internal name decoupled from the external name.

4. The computer-readable storage medium of claim 1, further comprising a friendly name field containing data representing a browsable name for the extension identified by the extension identifier field.

5. The computer-readable storage medium of claim 1, further comprising a description field containing data representing a textual description of the extension identified by the extension identifier field.

6. The computer-readable storage medium of claim 2, wherein the extension object extends a requested functionality not inherent in the class object.

7. The computer-readable storage medium of claim 6, wherein the extension package comprises an interface for obtaining the extension object that extends the requested functionality to the class object.

* * * * *